United States Patent [19]

Kaneko

[11] Patent Number: 4,773,611
[45] Date of Patent: Sep. 27, 1988

[54] FISHING REEL

[75] Inventor: Kyoichi Kaneko, Tokyo, Japan

[73] Assignee: Daiwa Seiko Inc., Tokyo, Japan

[21] Appl. No.: 82,998

[22] Filed: Aug. 7, 1987

Related U.S. Application Data

[63] Continuation of Ser. No. 864,131, May 16, 1986, abandoned.

[30] Foreign Application Priority Data

Jun. 26, 1985 [JP] Japan .................................. 60-97050

[51] Int. Cl.⁴ ............................................. A01K 89/01
[52] U.S. Cl. ............................................. 242/84.21 R
[58] Field of Search ................. 242/84.21 R, 84.21 G, 242/84.2 F

[56] References Cited

U.S. PATENT DOCUMENTS 2,344,209  3/1944  Lowe ........................... 242/84.21 R
4,416,428  11/1983  Noda ........................... 242/84.21 R

FOREIGN PATENT DOCUMENTS 941464  7/1948  France ......................... 242/84.21 R Primary Examiner—Stanley N. Gilreath
Assistant Examiner—Katherine Matecki
Attorney, Agent, or Firm—Browdy and Neimark

[57] ABSTRACT

A spinning reel for fishing is disclosed which can reduce the size of the reel as a whole and makes the reel more easily portable and packageable by moving forward the position of a casing without shortening the longitudinal stroke of a spool, and can let a handle shaft smoothly rotate when the reel is operated while being gripped by a hand together with a fishing rod, by bringing the position of the handle shaft close to a position immediately below a reel fitting leg.

5 Claims, 3 Drawing Sheets

FISHING REEL

This application is a continuation of application Ser. No. 864,131 filed May 16, 1986, now abandoned.

BACKGROUND OF THE INVENTION

This invention is concerned with an improvement in, or relating to, a spinning reel for fishing, and is directed to making a spinning reel compact and to improve its operability.

Spinning reels have been made compact in order to have them more easily portable and operable, but if the spinning reels are made merely compact, a longitudinal stroke length of the spools becomes so short that spools having a smaller line winding quantity must essentially be employed.

To solve this problem, the Applicant of the present invention proposed previously a spinning reel having a construction in which a front part of a casing incorporating therein a driving mechanism for rotating a rotor and reciprocating the spool is projected into a hollow recess formed at an inner rear part of the rotor, and a cylinder portion formed at a rear part of a line winding portion of the spool is superposed on the front part of the casing (Japanese Utility Model Laid-Open No. 6478/1984).

However, the prior art system described above is not yet free from the following problems. Namely, since a flange of the main body of the casing is positioned inside the recess, sand and other foreign matters are likely to enter the inside from the flange, and troubles are likely to occur in the operations of a bearing portion of a rotor rotary shaft cylinder or a stopper mechanism of the rotary shaft cylinder. In addition, since the flange is formed only on the main body of the casing, strength of a cover plate of the casing is not sufficiently high so that warp of the cover plate is great after shaping. This in turn results in the problem that twist force acts upon the cover plate through a handle shaft and a bearing during a line winding operation and promotes wear of a driving gear and other bearings; hence, it becomes difficult to keep stably sufficient meshing accuracy between a pinion and the driving gear and rotation performance drops. This tendency becomes remarkable particularly when the cover plate is shaped from a synthetic resin.

SUMMARY OF THE INVENTION

In order to eliminate the problems described above, it is a first object of the present invention to provide a spinning reel for fishing which can reduce the size of the reel as a whole and makes the reel more easily portable and packageable by moving forward the position of a casing without shortening the longitudinal stroke of a spool, and can let a handle shaft smoothly rotate when the reel is operated while being gripped by a hand together with a fishing rod, by bringing the position of the handle shaft to a position immediately below a reel fitting leg.

It is a second object of the present invention to provide a spinning reel which can prevent sand and other foreign matters from entering a recess of a rotor and from adhering to a rotor bearing or a stopper mechanism of the rotor and can also prevent them from disturbing the operations of the bearing and the stopper mechanism to insure their smooth operations for a long period, by forming projectingly flanges on the main body and cover plate of the casing, respectively, on substantially the same plane as a rear end surface of a hollow recess of the rotor.

It is a third object of the present invention to provide a spinning reel having higher durability having a construction wherein rib-like flanges prevent the occurrence of warp of a thin sheet-like cover plate of a casing after its shaping, reinforce the cover plate against the force that expands outward the cover plate due to a meshing pressure of gears of an internal driving mechanism, prevent the drop of meshing accuracy between a driving gear of a driving mechanism and a pinion, that has been a problem with the prior art devices, make the rotation performance of a handle shaft smooth and reliable and prevent any deformation of the cover plate and wear of the driving gear and each element of the driving mechanism such as a bearing during a line winding operation by a handle shaft.

These and other objects and novel features of the present invention will become more apparent from the following description when taken in conjunction with the accompanying drawings.

DESCRIPTION OF THE PREFERRED EMBODIMENT

Figure 1:
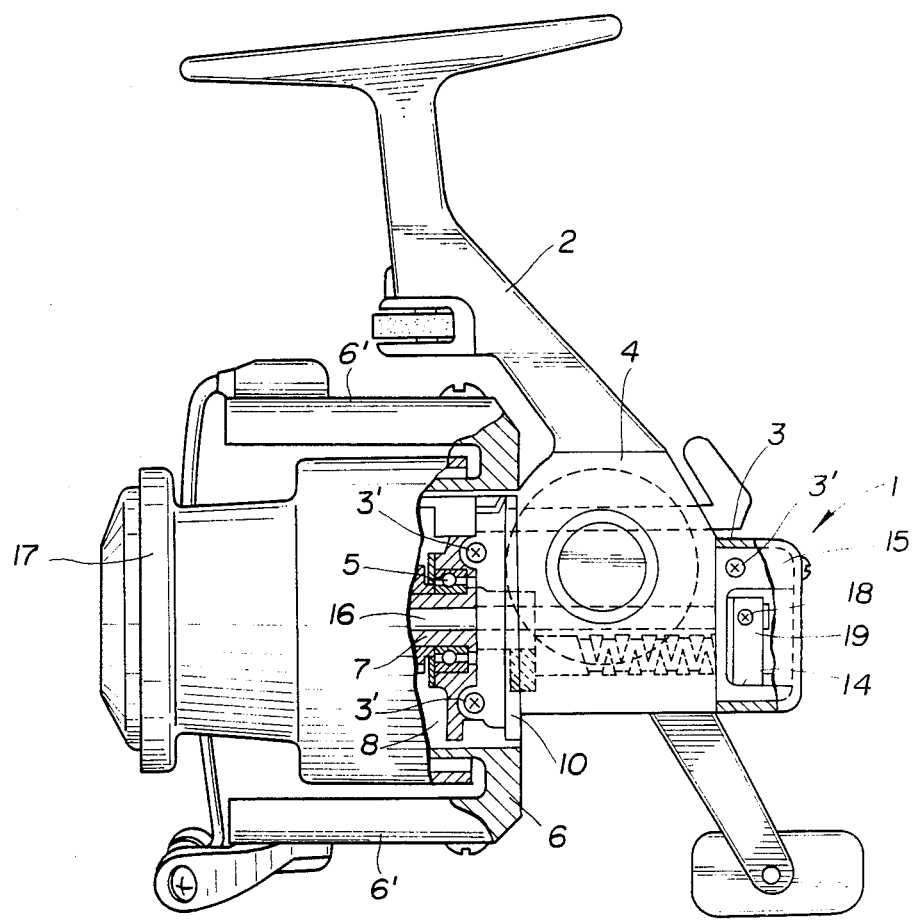
FIGS. 1 and 2 are partial cut-away front views of the present invention, respectively.
Figure 2:
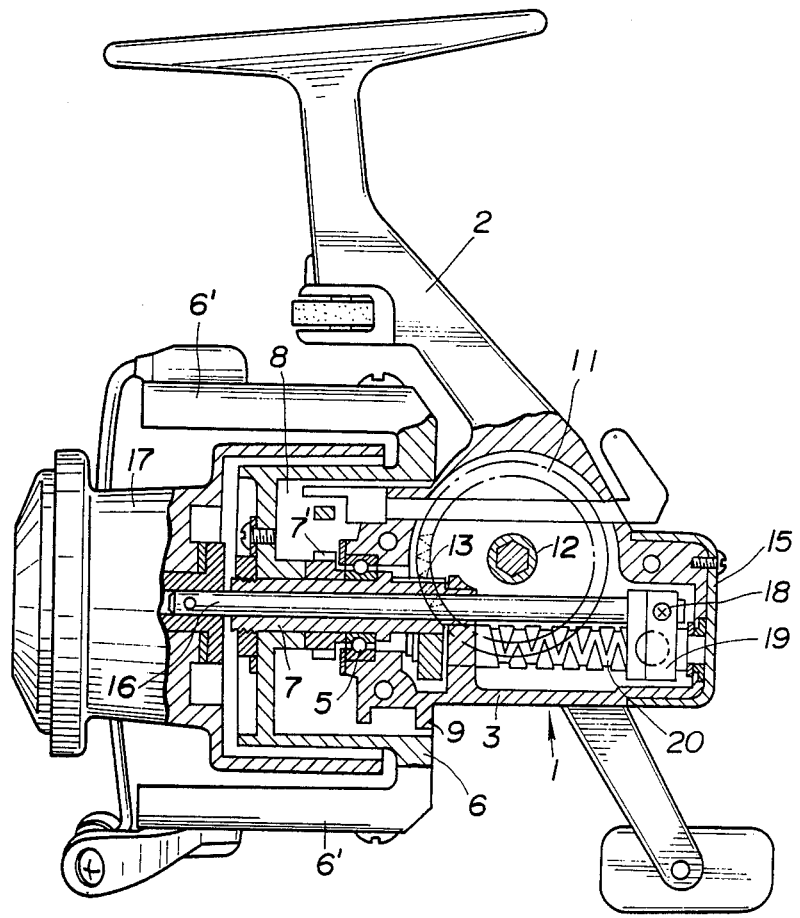
Figure 3:
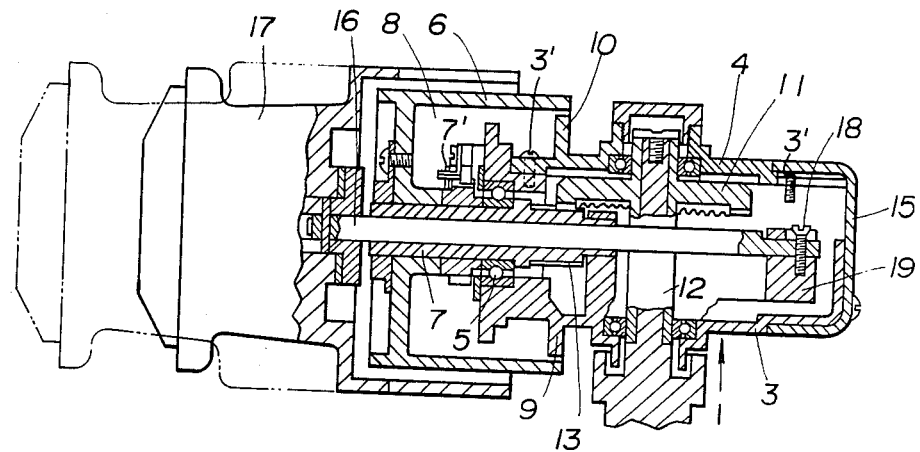
FIG. 3 is a partial-cut-away plan view.

Hereinafter, the present invention will be described in detail with reference to the accompanying drawings.

A casing 1 consists of a main body 3 having a reel fitting leg 2 and a cover plate 4. A front part of the main body 3 supports a rotary shaft cylinder 7 of a rotor 6 through a bearing 5, and this support portion and a front part of the casing 1 are fitted into and positioned inside a hollow recess 8 that is formed inside the rotor 6. Flanges 9 and 10 are integrally formed in a rib-like form on the main body 3 and the cover plate 4 on substantially the same plane as that of the rear end surface of the recess 8 in such a manner as to cover the recess 8, respectively. Furthermore, the cover plate 4 is fixed to the main body 3 by set screws 3' at its rear end portion and at a front part of the flange 10.

A pair of bail arm fiting arms 6', 6' project forward from the rear end portion of the rotor 6 in such a manner as to face each other, as is well known in the art. A heretofore known stopper mechanism 7' for checking reverse rotation is switchably disposed on the rotor rotary shaft cylinder 7 at the front portion of the bearing 5.

Bearings are disposed in the main body 3 of the casing 1 and in the cover plate 4 and support a handle shaft 12 having a driving gear 11. This gear 11 meshes with a pinion 13 which is disposed at the rear end of the rotor rotary shaft cylinder 7. A notch 14 is defined at the rear end portion of the cover plate 4, and a cap 15 is detachably fitted to the main body 3 in such a manner as to close the notch 14.

A spool shaft 16 is slidably inserted into the rotor shaft cylinder 7 as is well known in the art, and a spool 17 is fitted to the tip of the spool shaft 16. A slider 19 which is detachably fitted to the rear end of the spool shaft 16 by a set screw 18 meshes with a traverse cam shaft 20 which is supported by the main body 3 and is rotated by the pinion 13. The stroke of the spool shaft 16 is such that the rear end of a cylinder portion formed at the rear part of a line winding portion of the spool 17 slides till the rear end of the rotor when the spool moves back.

Figure 4:
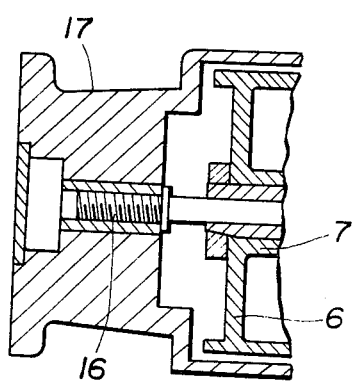
FIG. 4 is a longitudinal sectional front view of another embodiment of the present invention.

In the embodiment described above, the spool 17 and the rotor 6 can be taken out for explosion by removing the set screw 18 and pulling out forward the spool shaft 16 together with the spool 17. However, it is also possible to employ a structure wherein the spool 17' is removably screwed to the spool shaft 16' and is removed from the spool shaft 16' as depicted in FIG. 4.

In accordance with the present invention, the support portion at the front part of the casing for supporting the rotor rotary shaft cylinder is inserted into and positioned inside the recess formed inside the rotor, and the main body of the casing and the cover plate are equipped with the integral rib-like flanges on substantially the same plane as the rear end surface of the rotor recess in such a manner as to cover the recess. According to this arrangement, the spinning reel can be made compact and more easily portable without shorting the longitudinal stroke of the spool. Moreover, since the position of the handle shaft can be brought close to the position of a hand gripping the reel together with a fishing rod, the handle shaft can be operated easily. Particularly because the flanges are formed integrally and projectingly in the rib-like form on both the main body of the casing and the cover plate on substantially the same plane as the rear end surface of the recess, it becomes possible to prevent reliably sand and other foreign matters from entering and adhering to the bearing inside the bearing and the stopper mechanism. The warp of the thin sheet-like cover plate after molding is prevented by the flanges and its strength can also be improved. Therefore, the meshing accuracy between the pinion and the driving gear does not drop in the present invention unlike the prior art devices and the rotation performance can be made smooth and reliable, and the cover plate does not undergo deformation due to twist force during a winding operation of a line, so that the driving portions such as the driving gear and its bearing are not worn out. Thus, durability can be improved, too.

What is claimed is:

1. A spinning reel for fishing comprising
a spool at a front end of the reel, equipped with a line winding portion;
a casing at a rear end of the reel;
the spool including a first cylinder portion which extends from the line winding portion toward the rear end of the reel;
a reciprocating shaft, said spool being connected at a point inside said first cylinder portion of said spool to said reciprocating shaft for reciprocally moving said spool;
a rotor mounted between the spool and the casing and having a second cylinder portion which extends toward the spool into the first cylinder portion;
a pair of bail arm fitting arms on said rotor, said fitting arms projecting toward the front end of the reel on opposite sides of said spool,
and
a driving mechanism for rotating said rotor and reciprocating said reciprocating shaft incorporated in said casing
including a hollow rotary shaft coaxial with said reciprocating shaft for rotating said rotor, and
a handle with a handle shaft for rotating said hollow rotary shaft and reciprocating said spool back and forth;
said casing including a main body having a support portion for said hollow rotary shaft on a front part thereof, a first bearing portion for said handle shaft, and a cover plate removably fixed to a side portion of said main body and equipped with a second bearing portion, for said handle shaft, said cover plate being fixed detachably to said main body by screws at front and rear parts thereof;
wherein
a hollow recess is defined inside said cylinder portion of said rotor with an open end facing the rear end of the reel;
the front part of said casing including said support portion for said hollow rotary shaft is fitted into and positioned inside said recess,
a flange is formed integrally and projectingly in a rib-like form on respective parts of both said main body and said cover plate of said casing, substantially coplanar with the open end of said hollow recess direction, in such a manner as to cover said recess, said screws of said cover plate being located on said cover plate both frontwardly and rearwardly of said flange,
said driving mechanism including a connection between said handle shaft and said rotor for providing the rotation of the rotor via said hollow rotating shaft when the handle shaft is rotated, and a further connection between said hollow rotary shaft and said reciprocating shaft for the reciprocation of said spool as a result of rotation of said hollow rotary shaft.

2. The reel of claim 1 comprising a stopper mechanism for checking reverse rotation of said hollow rotary shaft disposed at said front part of said casing, said stopper mechanism, said support portion for said hollow rotary shaft and said front part of said casing being fitted into and positioned inside said hollow recess of said rotor.

3. A spinning reel for a fishing line, comprising
a spool at a front end of the reel and having a winding portion on which said line is wound;
a casing at a rear end of the reel;
said spool having a first hollow cylindrical portion extending from said winding portion toward the rear end of the reel to define a first cylindrical recess in a rear part of said spool, said winding portion and hollow cylindrical portion having a common axis,
a reciprocating shaft connected at a first end thereof to said spool to project coaxially with the spool from said first cylindrical recess toward the rear end of the reel for reciprocating said,
rotor means including a cylinder-end portion, a bore through the cylinder-end portion, through which the reciprocating shaft extends, a second hollow cylindrical portion extending from said cylinder-end portion toward the rear end of the reel to define second cylindrical recess in a rear part of said rotor means, a pair of fitting arms connected at opposite sides of a rear end of said second hollow cylindrical portion of said rotor means to extend forwardly toward said winding portion of said spool, a tubular bore extension portion in which said bore extends, said bore extension portion being connected at one end thereof to said cylinder-end portion and extending toward the rear end of the reel, and a rotor gear connected to a second end of said bore extension portion and through which said reciprocating shaft extends, wherein substantially all but said rear end of said second hollow cylindrical portion of said rotor means extends into said first cylindrical recess of said spool when said spool is at its closest point to the rear end of the reel during its reciprocating motion, the casing having an opening, both said casing and said opening extending into said second cylindrical recess of said rotor means, a cover plate for covering said opening in said casing, also extending into said second cylindrical recess of said rotor means, a flange comprising two flange portions, for effectively closing an open end of the second hollow cylindrical portion of said rotor means, a first of said flange portions being formed integrally with said casing and a second of said flange portions being formed integrally with said cover plate, a plurality of screw means, at least one screw means being located both frontwardly and rearwardly of said flange for connected said casing with said cover plate at said screw means, a circular support bearing coaxial with said axis and extending around said bore extension of said rotor means, said bearing being located between the rotor gear and the front end of the reel and being supported by both said casing and flange inside said second cylindrical recess of said rotor means, a handle shaft with a gear meshing with said rotor gear for rotating said rotor, said handle shaft being supported at one end by said casing and at another end by the cover plate, to be located outside said second cylindrical recess of said rotor means and spaced from said reciprocating shaft, said handle shaft having an axis that is perpendicular to said reciprocating shaft, a rotating shaft driven by said rotor gear and extending from said rotor gear toward the rear end of the reel, said rotating shaft being parallel to but spaced from said reciprocating shaft, said rotating shaft having reciprocation grooves distributed therein, and riding means connected at a rear end of said reciprocating shaft to ride in said reciprocation grooves along said rotating shaft, to thereby cause said reciprocation of said spool when said handle shaft is turned, the length of said reciprocation grooves along said rotating shaft determining the range of said reciprocating of said spool.

4. The reel of claim 3, wherein said gear of said handle shaft substantially meshes with said rotor gear at a position in a plane with the open end of said second hollow cylindrical portion of said rotor means.

5. The reel of claim 3, wherein said rotating shaft with said reciprocation grooves is supported at two ends by said casing, and said reciprocation grooves extend substantially therebetween.

* * * * *